United States Patent

Loutfy et al.

[11] 4,410,606
[45] Oct. 18, 1983

[54] LOW TEMPERATURE THERMALLY REGENERATIVE ELECTROCHEMICAL SYSTEM

[75] Inventors: Raouf O. Loutfy, Tucson, Ariz.; Alan P. Brown, Bolingbrook; Neng-Ping Yao, Clarendon Hills, both of Ill.

[73] Assignee: The United States of America as represented by the U.S. Department of Energy, Washington, D.C.

[21] Appl. No.: 370,639

[22] Filed: Apr. 21, 1982

[51] Int. Cl.³ .............................................. H01M 8/18
[52] U.S. Cl. .................................. 429/17; 429/20; 429/105; 429/106; 429/108
[58] Field of Search ................. 429/17, 20, 50, 51, 429/105, 106, 108, 120

[56] References Cited

U.S. PATENT DOCUMENTS

| | | | |
|---|---|---|---|
| 963,980 | 7/1910 | Basset | 429/20 |
| 2,700,063 | 1/1955 | Maneke | 429/149 |
| 3,253,955 | 5/1966 | Clampitt et al. | 429/106 |
| 3,536,530 | 10/1970 | Anthes et al. | 429/17 |
| 4,171,409 | 10/1979 | Loeb | 429/17 |
| 4,192,910 | 3/1980 | Frosch et al. | 429/105 |
| 4,215,182 | 7/1980 | Ang et al. | 429/15 |
| 4,292,378 | 9/1981 | Krumpelt et al. | 429/15 |
| 4,370,392 | 1/1983 | Savinell et al. | 429/51 |
| 4,377,623 | 3/1983 | Parker et al. | 429/105 |

OTHER PUBLICATIONS

Hempel, *Encyclopedia of Electric Chemistry*, p. 619, 1964.
Foster et al., *J. of Metals*, pp. 23-28, Jul. 1970.
Jardine, *Advances in Inorganic Chemistry and Radiochemistry*, pp. 115-163, 1970.
Iwamoto, *Rev. of Photography*, (Japan), pp. 278-282, 1967.

Primary Examiner—M. J. Andrews
Attorney, Agent, or Firm—Robert J. Fisher; William Lohff; Richard G. Besha

[57] ABSTRACT

A thermally regenerative electrochemical system including an electrochemical cell with two water-based electrolytes separated by an ion exchange membrane, at least one of the electrolytes containing a complexing agent and a salt of a multivalent metal whose respective order of potentials for a pair of its redox couples is reversible by a change in the amount of the complexing agent in the electrolyte, the complexing agent being removable by distillation to cause the reversal.

18 Claims, 8 Drawing Figures

LOW TEMPERATURE THERMALLY REGENERATIVE ELECTROCHEMICAL SYSTEM

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

This invention relates to an electrochemical system utilizing an electrochemical cell and more particularly to a thermally regenerative electrochemical system utilizing one or more electrochemical cells having water-based electrolytes containing salts of a multivalent metal whose respective order of potentials for a pair of its redox couples is reversible.

Thermally regenerative electrochemical systems have some similarities to secondary batteries except that the regeneration of the electrochemically active electrode reactants is accomplished thermally rather than electrically. They may also be considered as devices to convert or upgrade thermal energy to electrical energy and advantageously include chemical storage means for storing the energy until needed for electrical purposes.

Previously, thermally regenerative electrochemical systems have been characterized by a number of limitations. In some systems, the regeneration has involved the chemical decomposition of the reaction products to produce the initial reactants as disclosed in U.S. Pat. Nos. 3,536,530 and 936,980. Other systems have been regenerated by the distillation of a salt to provide two electrolytes of differing concentrations as in U.S. Pat. No. 4,292,378. Photoelectric devices have also been utilized to produce electricity to electrically generate electrolytes at lower temperatures but this has been limited by the cost and limited power associated with these devices.

Particularly with some systems associated with the chemical decomposition of the reaction products, the regeneration temperatures, energy requirements and corrosive conditions have been substantial. In many instances, the regeneration temperatures have been at least about 500° C. and often in excess of 500° C. In U.S. Pat. No. 3,536,530, the temperature of regeneration to form the initial chemical reactants is about 550° C. For a lithium hydride system as described in "The Encyclopedia of Electrochemistry", Hampel (ed.), 1964, p. 619, the regeneration temperature is about 900°–1200° C.

Since the cost of operating these regenerative electrochemical systems is dependent on the cost of the energy to regenerate the initial electrolytes for the electrochemical cell, attention has been directed to lower cost energy sources. One convenient source is heat available from low grade heat sources such as solar collectors or from industrial operations which provide heat at temperatures below 400° C. and often below about 200° C. While these sources of heat have cost advantages, the temperatures have usually been below those required for many regenerative systems.

Accordingly, one object of this invention is a new regenerative electrochemical system with advantages over those previously known. Another object is a regenerative electrochemical system in which regenerative energy is not utilized to decompose the reaction products to reform the initial electrolytes. A second object of the invention is a regenerative electrochemical system which does not require distillation of the metal salt in the electrolytes. An additional object of the invention is a thermally regenerative electrochemical system. Yet another object of the invention is a thermally regenerative electrochemical system in which the regeneration temperature is below about 400° C. and preferably below 200° C.

SUMMARY OF THE INVENTION

Briefly, the invention is directed to a regenerative electrochemical system in which regeneration of one or more electrolytes is carried out at a temperature below about 400° C. and preferably allow about 200° C. Another separate and important characteristic is that the system utilizes one or more water-based electrolytes containing a salt of a multivalent metal whose respective order of potentials for first and second redox couples in water is reversed by the addition of a complexing agent in an amount sufficient to cause the reversal. The inventive system includes at least one electrochemical cell including a pair of compartments with one or both containing water-based electrolytes in contact with associated electrodes and with at least one of the electrolytes containing a salt of the above described multivalent metal and the complexing agent.

In the operation of the electrochemical cell, both of the initial electrolytes become changed in composition and form other electrolytes, with the metal salt associated with the complexing agent in the one electrolyte being changed to a more stable form in a subsequent or third electrolyte. In a subsequent distillation step, the complexing agent is removed to a low value causing a reversal in potentials and a subsequent conversion of the electrolyte to form one of the initial electrolytes. The removed complexing agent is added to another electrolyte derived from the initial electrolytes to form another of the initial electrolytes. With this system, the thermal step is carried out to remove at least a portion of the complexing agent and does not require the removal by distillation of the metal salt or the chemical decomposition of the salt or the use of excessive temperature.

DETAILED DESCRIPTION OF THE INVENTION

The electrochemical system of the invention for converting thermal energy to electrical energy includes an electrochemical cell for storing the energy in chemical form and converting it to electrical energy as required. The cell includes first and second electrodes and two compartments separated by an ion exchange member and containing first and second water-based electrolytes in contact with the associated electrodes. At least one of the electrolytes contains a complexing agent and a salt of a multivalent metal whose respective order of potentials for first and second redox couples in water are reversed by the addition of the above complexing agent in an amount sufficient to cause the reversal. In the operation of the cell, both electrolytes are changed in composition with the electrolyte resulting from the one electrolyte containing the complexing agent being identified as a third electrolyte.

In order to regenerate one or both of the original electrolytes, regeneration means are provided including means for thermally removing at least a portion of the complexing agent from at least the third electrolyte to reverse the order of the potentials causing the composition to change to a more stable form resulting in a fourth electrolyte. The complexing agent is added to a fifth electrolyte derived from one of the electrolytes identified with operation of the cell, with the resulting electrolyte forming the original first or second electrolyte.

Figure 1:
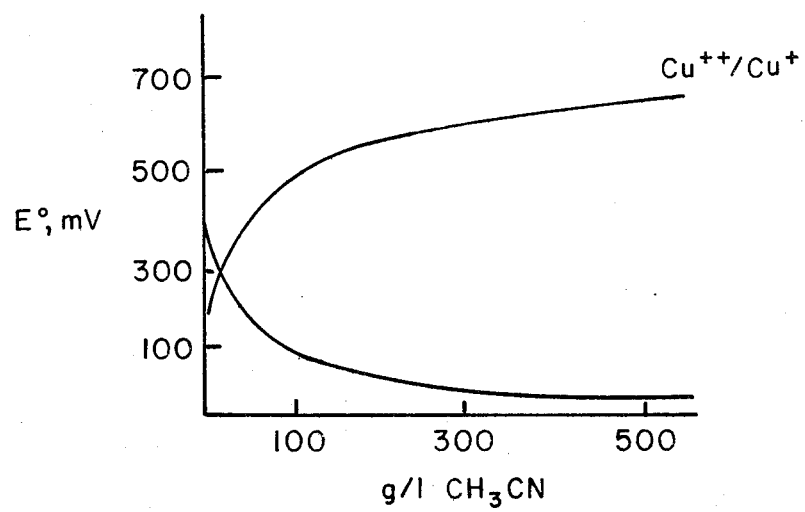
FIG. 1 is a graph showing the change in potentials for copper redox couples with respect to concentration of $CH_3CN$ in an aqueous solution.
Figure 2:
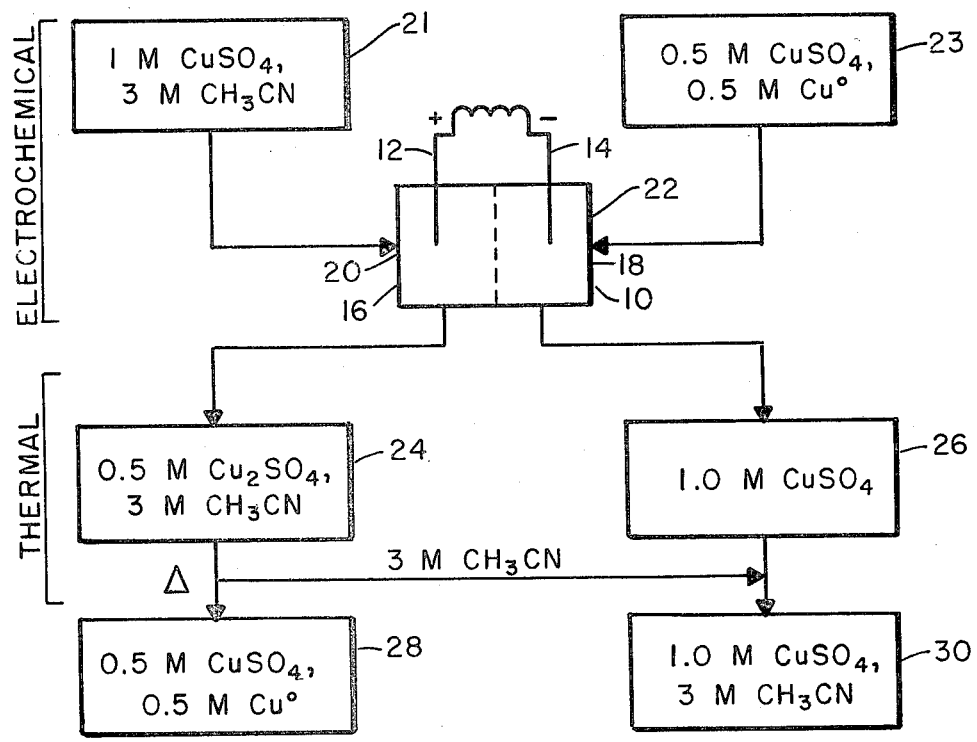
FIG. 2 is a schematic of one embodiment of the invention.

As illustrated in FIG. 2, the cell is constructed with two compartments containing the electrolytes and an electrode in contact with the appropriate electrolyte. At least one and preferably both electrolytes are water-based and contain a salt of a multivalent metal characterized by at least two redox couples $C^{n+1}/C^n$ and $C^n/C^{n-1}$ with the respective potentials in water reversible by the addition of a complexing agent. Advantageously, the metal salt is a copper salt and may include copper sulfate, nitrate, acetate or other salt of an acid which does not strongly complex with the copper salt as with the complex of HCl and CuCl. Illustrative of the potentials for the copper redox couples as illustrated in FIG. 1 are the following values (vs NHE) in water in the absence and presence of $CH_3CN$.

|  | Aqueous | Complexing Medium ($CH_3CN$) |  |
|---|---|---|---|
| $Cu^{++}/Cu^+$ | 0.17 V | $Cu^{++}/Cu^+$ | 0.65 V |
| $Cu^+/Cu^o$ | 0.52 V | $Cu^+/Cu^o$ | 0.05 V |

As indicated, the order of the potentials is reversed by the addition of a complexing agent which is added in an amount sufficient to reverse the order. For $CH_3CN$, this amount is in the order of about 2.5-3.0 moles of complexing agent per mole of cuprous salt. From the above potentials, the reaction occurring in the cell is governed by the equation

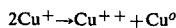
$$2Cu^+ \rightarrow Cu^{++} + Cu^o$$

with the cupric ion ($Cu^{++}$) being more stable in the noncomplexed aqueous system and with the cuprous ion ($Cu^+$) being more stable in the complexed system. Further characteristics of the potentials for $CuSO_4/Cu_2SO_4$ and $Cu_2SO_4/Cu$ couples are shown in A. J. Parker, et al., Aust. J. Chem. 30, 1661 (1977). It is to be understood that $Cu_2SO_4$, when complexed with $CH_3CN$, represents the $Cu^+$ ion in the form $Cu^{3o}(CH_3CN)_2$.

Since the complexing agent is subsequently removed by distillation or other means utilizing thermal energy, the complexing agents are preferably characterized by boiling temperatures between about 30°–90° C. Suitable complexing agents with these characteristics are nitriles with the formula RCN where R is a hydrocarbon with 1-3 carbon atoms; organic amides of the formula

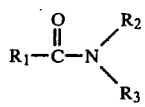

where $R_1$ is a hydrocarbon with 1-2 carbon atoms and $R_2$ and $R_3$ are hydrocarbons with 1-3 carbon atoms; and organic nitrates with the formula $R_4NO_3$ where $R_4$ is a hydrocarbon of 1-3 carbon atoms, and preferably the first two compositions.

The sufficient amounts of each complexing agent to cause the desired reversal may be determined in a conventional manner from available stability data and data on potentials associated with $Cu^+$ and $Cu^{++}$ ions for each agent.

In the operation of the cell, the original electrolytes are changed in composition. To illustrate, an aqueous solution of $CuSO_4$ with the complexing agent $CH_3CN$ will form $Cu(CH_3CN)_2^+$. In the other electrolyte, a source of $Cu^o$ in contact with an aqueous solution of $CuSO_4$ will form additional quantities of $CuSO_4$. In another embodiment, a source of $Cu^o$ in the presence of $Cu_2SO_4$ and $CH_3CN$ will form additional quantities of $Cu_2SO_4$ while $CuSO_4$ with $CH_3CN$ in the other original electrolyte will form $Cu(CH_3CN)_2^+$.

Regeneration means is utilized with the changed electrolytes in the cell to eventually form one or both of the original electrolytes. Advantageously, the regeneration means includes means for thermally removing at least a portion of the complexing agent to reverse the order of the potentials. To illustrate, distillation of a solution of $Cu_2SO_4$ and $CH_3CN$ will remove a portion of $CH_3CN$ sufficient to reverse the potentials and form $CuSO_4$ and $Cu^o$ as a result of the above equation. The $CH_3CN$ is added to the other changed electrolyte containing $CuSO_4$ to form a solution of $CuSO_4$ and $CH_3CN$. $CuSO_4$ remains unchanged since no source of $Cu^o$ is present to complete the reaction.

In one embodiment of the invention illustrated in FIG. 2, an electrochemical cell 10 is illustrated with electrodes 12 and 14 in compartments 16 and 18 respectively containing electrolytes 20 and 22 as indicated in boxes 21 and 23. As illustrated, electrolyte 20 is composed of an aqueous solution of one molar $CuSO_4$ and a 3 molar $CH_3CN$. Sulfuric acid is also present to improve the conductivity of the solution. The second electrolyte is composed of an aqueous solution of 0.5 molar $CuSO_4$ and a source of elemental copper sufficient to form a $Cu^+$ or $Cu^{++}$ concentration of 0.5 molar. In the operation of the cell 10, the first electrolyte 20 is changed in composition to form a third electrolyte 24 containing 0.5 molar $Cu_2SO_4$ with the $CH_3CN$ unchanged. The second electrolyte 22 is changed to a fifth electrolyte 26 with the elemental copper being changed to $CuSO_4$ to form a one molar solution. As illustrated, at least a portion of the complexing agent $CH_3CN$ is distilled at a temperature below about 200° C. from the third electrolyte 24 and transferred to electrolyte 26 to form a sixth electrolyte 30. From the distillation, the third electrolyte 24 is converted to a fourth electrolyte 28 which is composed of 0.5 $CuSO_4$ and a source of elemental copper. The resultant electrolytes 28 and 30 represent both of the original electrolytes 22 and 20 for cell 10.

Figure 3:
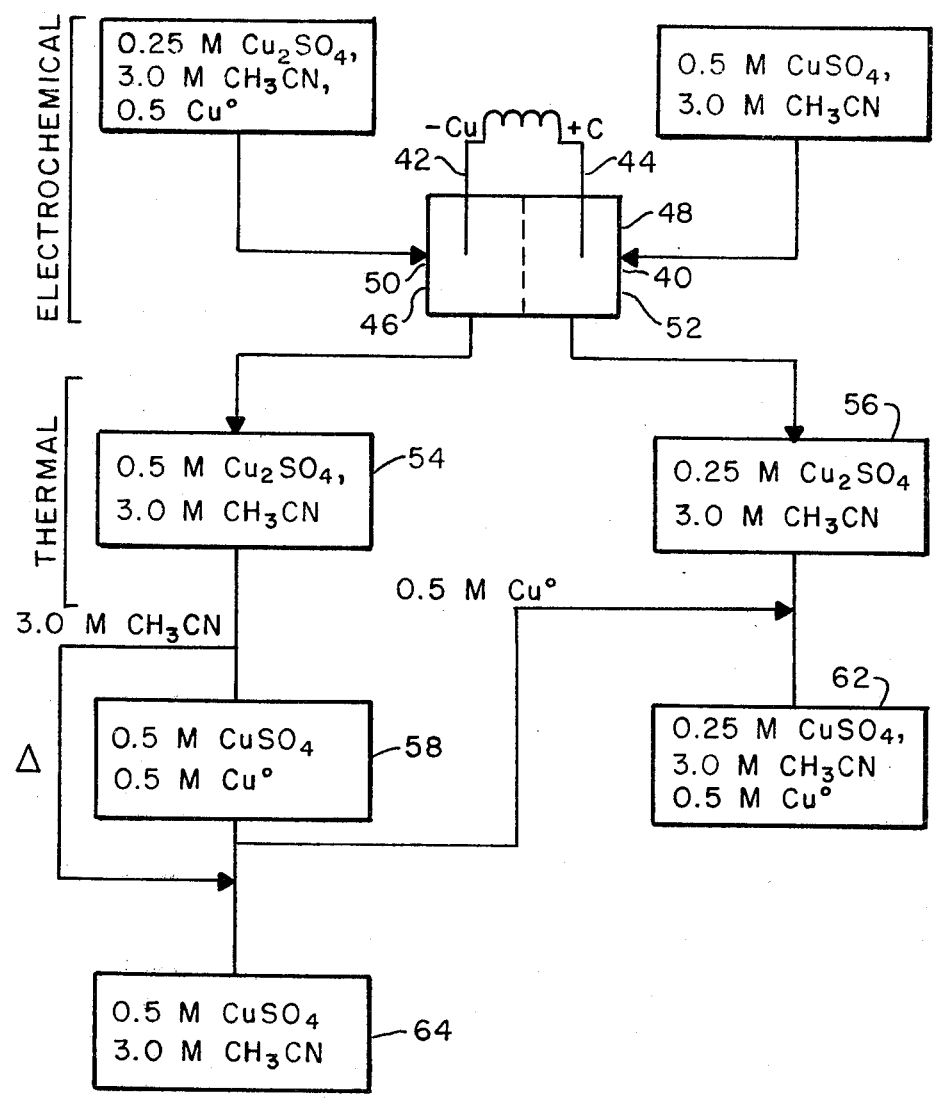
FIG. 3 is a schematic of a second embodiment of the invention.

In a second embodiment as illustrated in FIG. 3, cell 40 includes electrodes 42 and 44 inserted in compartments 46 and 48 respectively containing a first electrolyte 50 and a second electrolyte 52. In the operation of cell 40, a third electrolyte 54 is formed from first electrolyte 50 and represents an oxidation of elemental copper to its cuprous form. Also, fifth electrolyte 56 is derived from second electrolyte 52 and represents a reduction in electrolyte 52 to a cuprous form. As illustrated, the electrolyte 54 is distilled to remove at least a portion of $CH_3CN$ to form fourth electrolyte 58 composed of $CuSO_4$ and a source of $Cu^o$. The elemental copper is transferred to a fifth electrolyte 56 to form sixth electrolyte 62 while the complexing agent withdrawn from the third electrolyte 54 is added to electrolyte 58 to form seventh electrolyte 64 containing $CuSO_4$ and $CH_3CN$. In this embodiment, both the complexing agent and elemental copper are selectively removed from certain electrolytes and added to other electrolytes to form the initial electrolytes 52 and 50.

Figure 4:
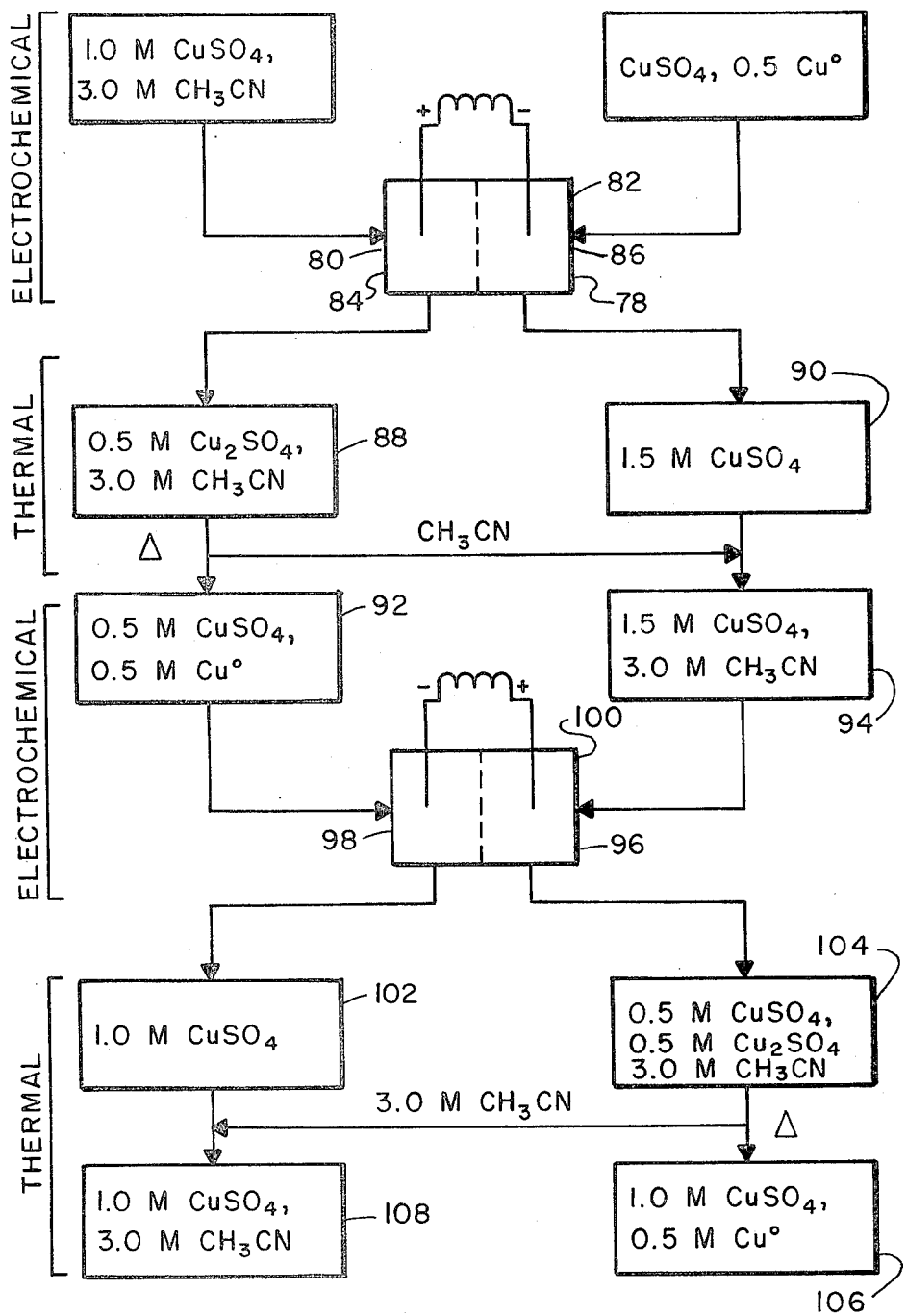
FIG. 4 is a schematic of a third embodiment of the invention.

In a third embodiment as illustrated in FIG. 4, the initial electrolytes are first and second electrolytes 80 and 82 contained in compartments 84 and 86 in cell 78. In the operation of the cell 78, a third electrolyte 88 and fifth electrolyte 90 are formed. As illustrated, the complexing agent $CH_3CN$ is removed by distillation from electrolyte 88 to form fourth electrolyte 92 with the complexing agent being transferred to electrolyte 90 to form sixth electrolyte 94. While electrolytes 92 and 94 represent similar compositions to the original electrolytes 82 and 80, the concentrations are made more identical through the use of cell 96 with compartments 98 and 100 in which electrolyte 92 is changed to electrolyte 102 and electrolyte 94 is changed to electrolyte 104. A portion of the complexing agent is removed from electrolyte 104 to form electrolyte 106 while the complexing agent is added to electrolyte 102 to form electrolyte 108 with electrolytes 106 and 108 forming the original electrolytes 80 and 82.

Figure 5:
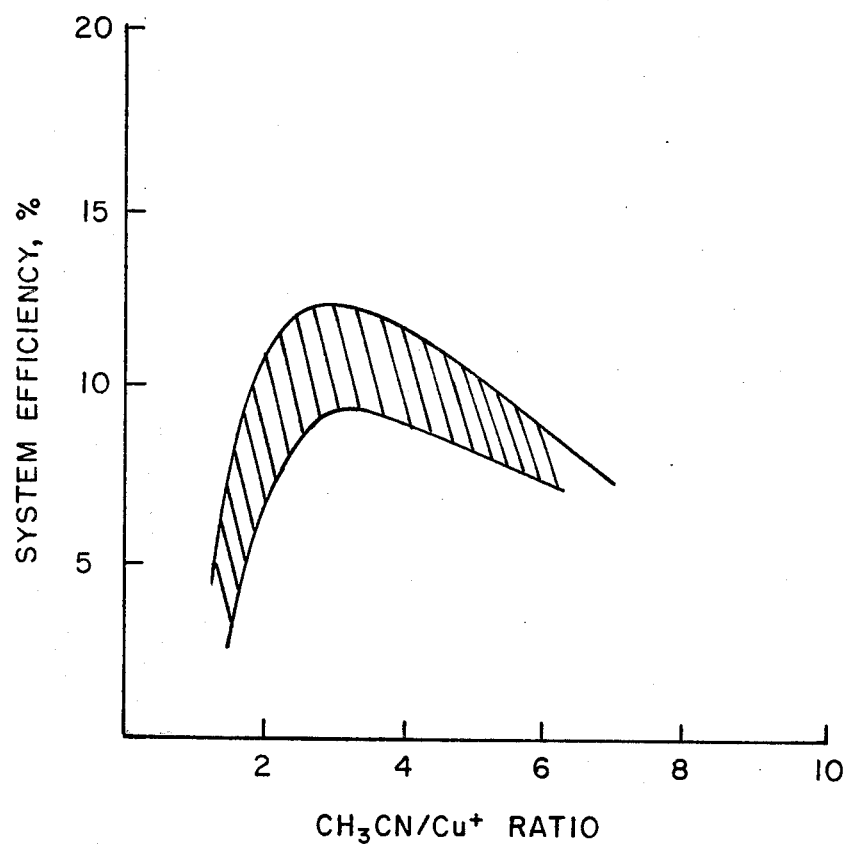
FIG. 5 is a graph showing efficiency versus $CH_3CN/Cu^+$ ratio.

FIG. 5 represents a graph in which the efficiency of the overall system is plotted versus the molar ratio of complexing agent to cuprous ion concentration. As indicated in the graph, the efficiency reaches a maximum at a ratio of about 2.5–3.0. Other tests were conducted and reveal that a ratio of approximately 2.5 is the value at which the respective order of potentials for the redox couples changes from one direction to another although the relationship does not involve an abrupt change.

Figure 6:
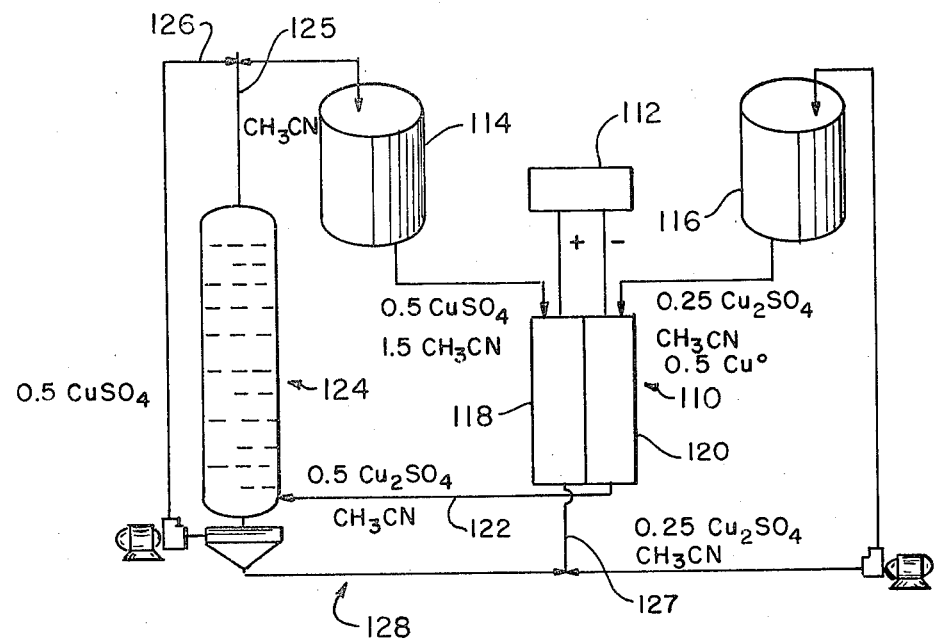
FIG. 6 is a schematic of a fourth embodiment of the invention.

In FIG. 6, a diagram is provided to show the overall operation of the system with a distillation unit. As illustrated, cell 110 is operated to generate power for load 112 with supply tanks 114 and 116 providing sources of electrolytes for compartments 118 and 120, respectively. The electrolyte resulting from the operation of the cell is withdrawn from compartment 120 and transferred via conduit 122 to distillation unit 124 where the complexing agent $CH_3CN$ is removed overhead by conduit 125 to be mixed with a source of $CuSO_4$ from conduit 126 to form the electrolyte for tank 114. The source of $CuSO_4$ is obtained from the bottoms of distillation tower 124 which also includes a source of elemental copper by conduit 128 which is returned to be mixed with the electrolyte withdrawn by conduit 127 from compartment 118 and then transferred to tank 116 to form the electrolyte for compartment 120.

The following examples are provided for illustrative purposes and are not intended to be restrictive as to scope of the invention:

EXAMPLES I–II

Figure 7:
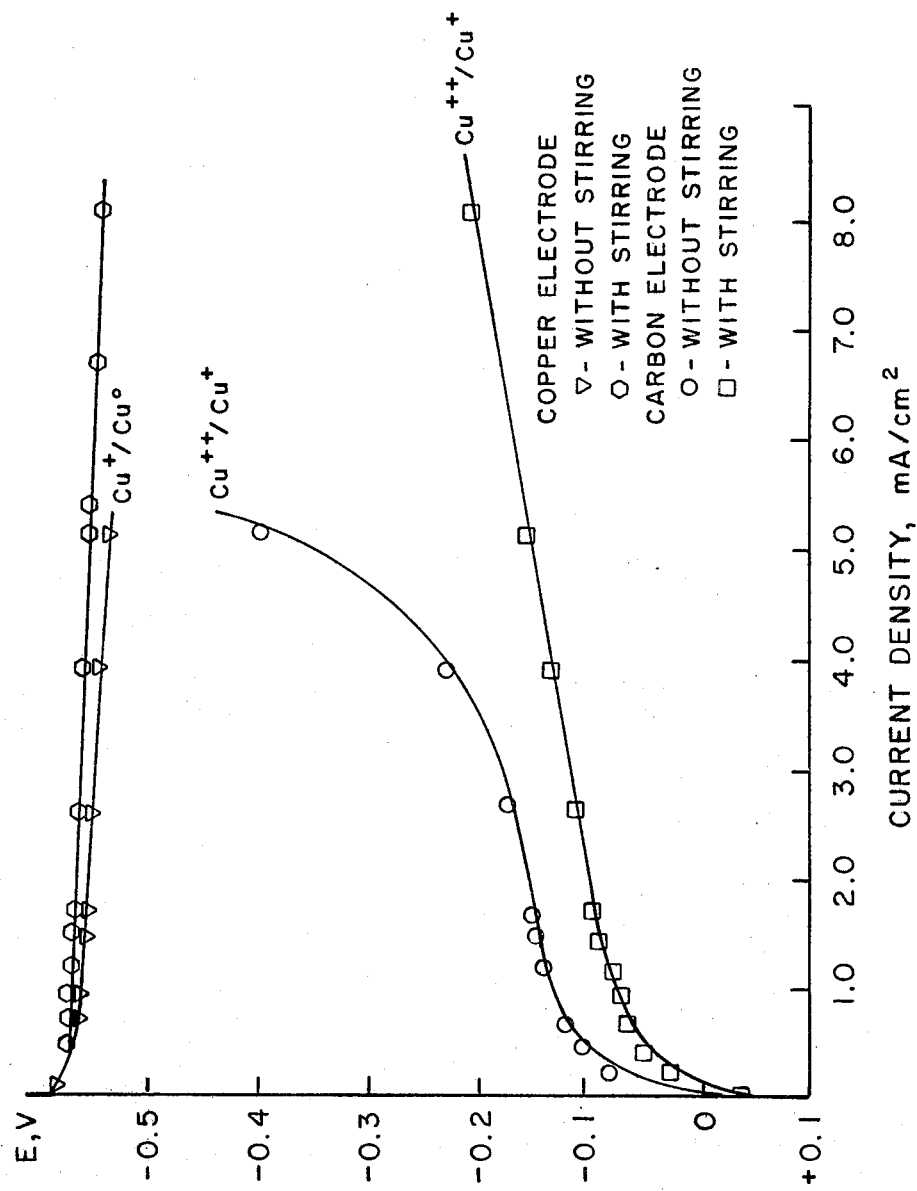
FIG. 7 is a graph of voltage versus current density for Example I.
Figure 8:
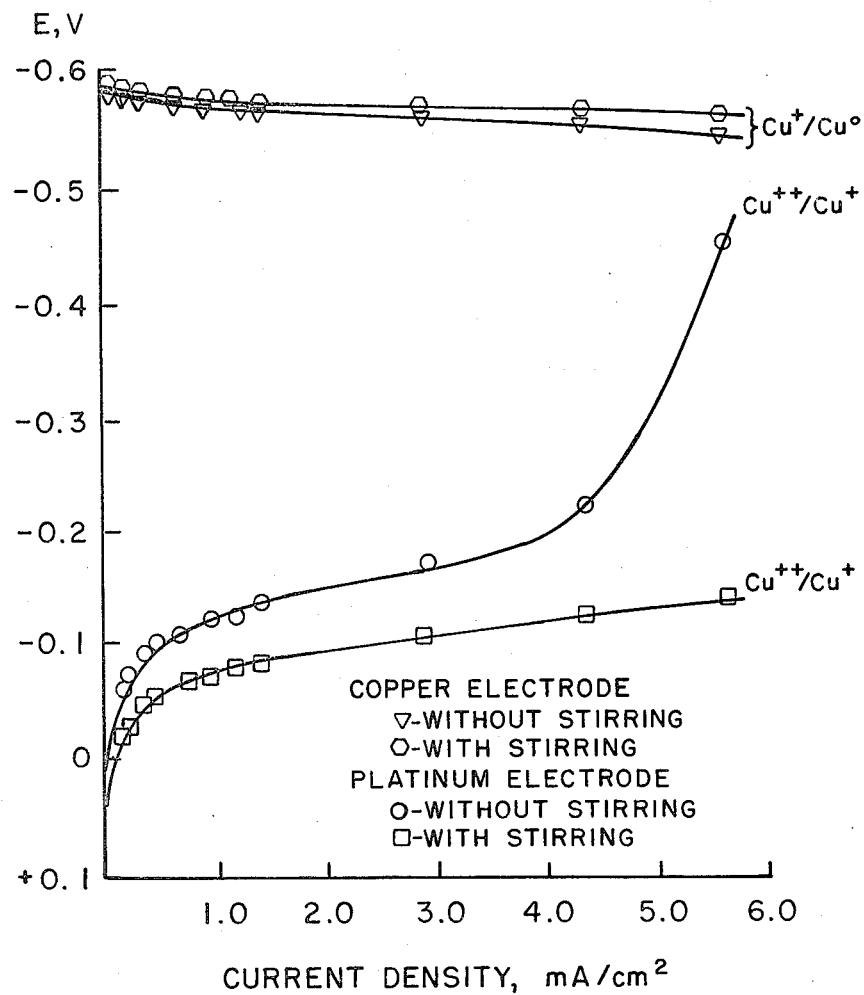
FIG. 8 is a graph of voltage versus current density for Example II.

An electrochemical cell was constructed of two glass compartments separated by a fine porosity-fitted glass disc. The anode was a copper rod of about 0.08 cm$^2$ in diameter with the electrolyte in the associated compartment being an aqueous solution of about 0.625 M $Cu_2SO_4$, 0.75 M $H_2SO_4$ and 3.5 M $CH_3CN$. The cathode was carbon in one test and platinum in a second test. The associated electrolyte was an aqueous solution of about 0.25 M $CuSO_4$, 0.5 M $H_2SO_4$ and 3.5 M $CH_3CN$. With the cell at a substantially charged condition, the electrode potential of the anode and cathode were measured as a function of an imposed discharging current with the results being shown in FIG. 7 for the carbon cathode and in FIG. 8 for the platinum cathode. As indicated by the data, the copper anode shows very little polarization with increasing current density. For each cathode some polarization is exhibited and is significantly affected by stirring of the electrolyte. The data further indicate that the cell voltages are in the order of 0.5–0.55 volts at discharge current densities of up to about 5–6 mA-cm$^{-2}$.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of the invention in which an inclusive property or privilege is claimed are defined as follows:

1. An electrochemical system comprising an electrochemical cell having first and second electrodes and two compartments separated by an ion exchange membrane and containing first and second water-based electrolytes in respective contact with said first and second electrodes, at least one of the first and second electrolytes containing a complexing agent and a salt of a multivalent metal whose respective order of potentials for first and second redox couples in water are reversed by the addition of said complexing agent in an amount sufficient to cause said reversal, said agent being present in at least said amount, said one electrolyte being converted to a third electrolyte in the operation of the cell, and means for regenerating said first or second electrolyte from said third electrolyte in a sequence of steps, said regeneration means including thermal means for removing at least a portion of said complexing agent from said third electrolyte to reverse the order of said potentials and form a fourth electrolyte and means for adding said complexing agent to a fifth electrolyte derived from said electrolytes in said cell to form said first or second electrolyte.

2. The system of claim 1 wherein said regenerating means includes a second electrochemical cell and a second thermal means.

3. The system of claim 1 wherein said second electrolyte contains a salt of said multivalent metal and said multivalent metal is copper.

4. The system of claim 1 wherein one of said compartments contains a source of the elemental form of said metal.

5. The system of claim 3 wherein said thermal means includes distillation means operative at temperatures below about 200° C.

6. The system of claim 5 wherein said metal is copper, said complexing agent is $CH_3CN$ and said amount is above about 2.5 moles of complexing agent per mole of the cuprous ion.

7. The system of claim 5 wherein said complexing agent has a boiling temperature between about 30°–90° C.

8. The system of claim 7 wherein said first and second electrolytes each contain said complexing agent.

9. The system of claim 6 wherein said salt of copper is a sulfate, nitrate or acetate salt.

10. The system of claim 8 wherein said first and second electrolytes include an acid which does not form a complex with said salt.

11. The system of claim 7 wherein the complexing agent is RCN where R is hydrocarbon with 1–3 carbon atoms.

12. The system of claim 7 wherein the complexing agent is

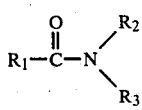

where $R_1$ is hydrocarbon with 1–2 carbon atoms and $R_2$ and $R_3$ are each hydrocarbons with 1–3 carbon atoms.

13. The system of claim 7 wherein the complexing agent is

where $R_4$ is a hydrocarbon with 1–3 carbon atoms.

14. A method of converting thermal energy to electrical energy comprising the steps of providing an electrochemical cell having first and second electrodes and two compartments separated by an ion exchange membrane and containing first and second water-based electrolytes in respective contact with said first and second electrodes, at least one of the first and second electrolytes containing a complexing agent and a salt of a multivalent metal whose respective order of potentials for first and second redox couples in water are reversed by the addition of said complexing agent in an amount sufficient to cause said reversal, said agent being present in at least said amount, operating said cell to produce electrical energy and convert one electrolyte to a third electrolyte, and regenerating said first or second electrolyte from said third electrolyte including the steps of thermally removing at least a portion of said complexing agent from said third electrolyte to a value below said amount to reverse the order of said potentials to form a fourth electrolyte and adding said complexing agent to a fifth electrolyte derived from said electrolytes in said cell to form said first or second electrolyte.

15. The method of claim 14 wherein said regenerating step includes the step of operating a second electrochemical cell after said removal of said complexing agent.

16. The method of claim 15 wherein said thermal removal step includes distilling the third electrolyte to remove said complexing agent.

17. The method of claim 16 wherein said distillation step is carried out at a temperature below about 200° C.

18. The method of claim 17 wherein said multivalent metal is copper.